(12) United States Patent
Kakarala

(10) Patent No.: US 7,969,410 B2
(45) Date of Patent: Jun. 28, 2011

(54) OPTICALLY DETECTING CLICK EVENTS

(75) Inventor: Ramakrishna Kakarala, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1166 days.

(21) Appl. No.: 11/508,685

(22) Filed: Aug. 23, 2006

(65) Prior Publication Data

US 2008/0048972 A1 Feb. 28, 2008

(51) Int. Cl.
G09G 5/00 (2006.01)

(52) U.S. Cl. ........ 345/156; 345/166; 345/173; 345/175; 382/260; 382/261; 382/262; 382/263; 382/264; 382/265

(58) Field of Classification Search .................. 345/156, 345/166, 173, 175; 382/260–265
See application file for complete search history.

(56) References Cited

U.S. PATENT DOCUMENTS

| 5,963,661 A * | 10/1999 | Kato et al. .................... 382/149 |
| 6,057,540 A | 5/2000 | Gordon et al. |
| 6,826,295 B2 * | 11/2004 | Lichtermann et al. ........ 382/124 |
| 2004/0160420 A1 * | 8/2004 | Baharav et al. ............... 345/173 |
| 2004/0234107 A1 * | 11/2004 | Machida et al. ............. 382/107 |

FOREIGN PATENT DOCUMENTS

WO    WO 03/102717 A2    12/2003

* cited by examiner

*Primary Examiner* — Richard Hjerpe
*Assistant Examiner* — Saifeldin Elnafia

(57) ABSTRACT

Apparatus and method of optically detecting click events are described. Images of a contact surface are captured at respective capture times. The captured images are convolved with a two-dimensional circularly symmetric spatial bandpass filter to produce corresponding filtered images each including a set of pixels with respective pixel value magnitudes. Based on the pixel value magnitudes of the corresponding filtered images, each of the capture times is assigned to one of an in-contact time class during which the contact surface is determined to be in-contact with a user's finger and an out-of-contact time class during which the contact surface is determined to be out-of-contact with the user's finger. A select signal indicating that the contact surface has been touched to make a selection is generated based on a click event predicate defining at least one condition on the time classes respectively assigned to successive ones of the capture times.

20 Claims, 7 Drawing Sheets

OPTICALLY DETECTING CLICK EVENTS

BACKGROUND

Many different types of devices have been developed for inputting commands into a machine. For example, hand-manipulated input devices, such as computer mice, joysticks, trackballs, touchpads, and keyboards, commonly are used to input instructions into a computer by manipulating the input device. Such input devices allow a user to control movement of a virtual pointer, such as a cursor, across a computer screen, select or move an icon or other virtual object displayed on the computer screen, and open and close menu items corresponding to different input commands. Input devices commonly are used in both desktop computer systems and portable computing systems.

Input devices typically include a mechanism for converting a user input into user interface control signals, such as cursor position data and scrolling position and distance data. Although some types of input device use electromechanical transducers to convert user manipulation of the input device into user interface control signals, most recently developed input devices use optical navigation sensors to convert user manipulation of the input device into user interface control signals. The optical navigation sensors employ optical navigation technology that measures changes in position by acquiring a sequence of images of light reflecting from a surface and mathematically determining the direction and magnitude of movement over the surface from comparisons of corresponding features in the images.

In addition to generating input signals in response to tracked movement, many optical input devices include buttons or other electromechanical selection devices to enable user to input selection commands (oftentimes referred to as single or multiple "click" commands). Such selection devices typically enable user to select objects, open and close virtual folders, and execute software applications.

With the increasing trends of minimizing the sizes of portable electronic devices and combining multiple functionalities into single devices, there is a constant push toward reducing the space required for implementing input device functionality. What are needed are systems and methods that can optically detect click events and can be integrated with other input device functionality without significantly increasing space requirements.

SUMMARY

In one aspect, the invention features an apparatus that includes a window that has a contact surface, an image capture system, and a processing system. The image capture system captures images of the contact surface through the window at respective capture times. The processing system convolves the captured images with a two-dimensional circularly symmetric spatial bandpass filter to produce corresponding filtered images each including a respective set of pixels with assigned pixel values having respective magnitudes. Based on the magnitudes of the pixel values of the corresponding filtered images, the processing system assigns each of the capture times to one of an in-contact time class designating times during which the contact surface is determined to be in-contact with a user's finger and an out-of-contact time class designating times during which the contact surface is determined to be out-of-contact with the user's finger. The processing system generates a select signal indicating that the contact surface has been touched to make a selection based on a click event predicate defining at least one condition on the time classes respectively assigned to successive ones of the capture times.

In another aspect, the invention features a method in accordance with which images of a contact surface are captured at respective capture times. The captured images are convolved with a two-dimensional circularly symmetric spatial bandpass filter to produce corresponding filtered images each including a respective set of pixels with assigned pixel values having respective magnitudes. Based on the magnitudes of the pixel values of the corresponding filtered images, each of the capture times is assigned to one of an in-contact time class during which the contact surface is determined to be in-contact with a user's finger and an out-of-contact time class during which the contact surface is determined to be out-of-contact with the user's finger. A select signal indicating that the contact surface has been touched to make a selection is generated based on a click event predicate defining at least one condition on the time classes respectively assigned to successive ones of the capture times.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail below provide input apparatus that are capable of optically detecting click events based on an efficient and effective image analysis process. Some implementations of these embodiments provide a robust false alarm avoidance mechanism that dynamically adjusts the click detection process in response to changing environmental conditions. The embodiments that are described herein also can be integrated with other input device functionality, such as optical navigation input technology, without significantly increasing space requirements.

II. Overview

Figure 1:
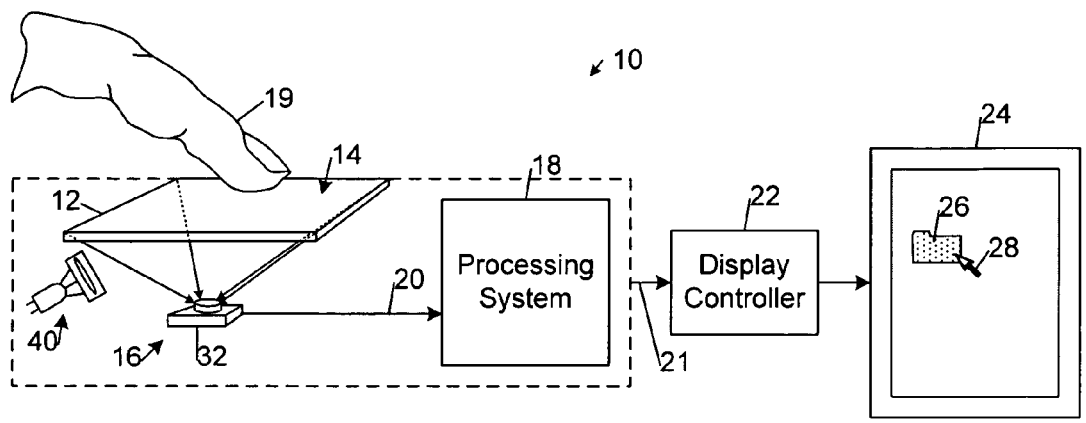
FIG. 1 is a block diagram of an embodiment of an input apparatus that includes a window with a contact surface, an image capture system, and a processing system in an exemplary operational environment.

FIG. 1 shows an embodiment of an input apparatus 10 that includes a window 12 that has a contact surface 14, an image capture system 16, and a processing system 18.

Figure 2A:
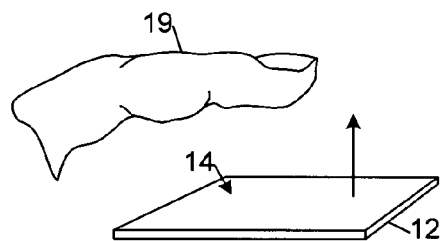
FIG. 2A is a diagrammatic view of a user's finger's lifted off the contact surface of the input apparatus shown in FIG. 1.
Figure 2B:
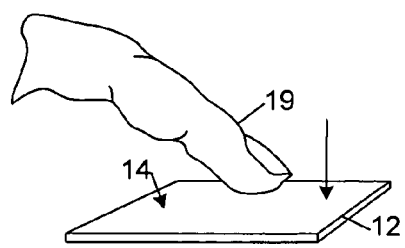
FIG. 2B is a diagrammatic view of the user's finger's placed back down on the contact surface of the input apparatus shown in FIG. 2A.

In operation, a user typically touches the contact surface 14 to make a selection by first lifting a fingertip 19 off the contact surface 14, as shown in FIG. 2A, and, within a relatively short time thereafter, placing the fingertip 19 back down onto the contact surface 14, as shown in FIG. 2B. The time period between a finger lift-off and a subsequent finger put-down that is intended to indicate a selection (i.e., a "click event") typically is in the range of 0.1-0.3 seconds, although this range may vary depending on the preferences and usage patterns of the user. As explained in detail below, the input apparatus 10 detects click events based on an efficient and effective process of analyzing the images 20 that are captured by the image capture system 16.

In general, the input apparatus 10 may be incorporated into any type of device or system in which sensing click events serves a useful purpose. For illustrative purposes, the input apparatus 10 is described herein as a component of a device for inputting commands into a machine, where the input apparatus 10 may have any of a wide variety of different form factors, including a computer mouse, a joystick, a trackball, a steering wheel controller, and an optical sensing surface of an electronic device. In the illustrative operational environment shown in FIG. 1, the input apparatus 10 outputs select signals 21 (oftentimes referred to as single or multiple "click" commands) to a display controller 22 that drives a display 24. The display controller 22 processes the select signals 21 to control, for example, the selection of objects, the opening and closing of a virtual folder 26, and the execution of software applications that are represented by icons that coincide with a pointer 28 on the display 24. The display controller 22 typically executes a driver to process the select signals 21. In general, the driver may be implemented in any computing or processing environment, including in digital electronic circuitry or in computer hardware, firmware, or software. In some embodiments, the driver is a component of an operating system or a software application program. The display 24 may be, for example, a flat panel display, such as a LCD (liquid crystal display), a plasma display, an EL display (electro-luminescent display) and a FED (field emission display).

In some embodiments, the input apparatus 10 and the display 24 are implemented as separate discrete devices, such as a separate pointing device and a remote display-based system. In these embodiments, the remote system may be any type of display-based appliance that receives user input, including a general-purpose computer system, a special-purpose computer system, and a video game system. The select signals 21 may be transmitted to the remote system over a wired communication link (e.g., a serial communication link, such as an RS-232 serial port, a universal serial bus, or a PS/2 port) or a wireless communication link (e.g., an infrared (IR) wireless link or a radio frequency (RF) wireless link). In other embodiments, the input apparatus 10 and the display 24 are integrated into a single unitary device, such as a portable (e.g., handheld) electronic device. The portable electronic device may be any type of device that can be readily carried by a person, including a cellular telephone, a cordless telephone, a pager, a personal digital assistant (PDA), a digital audio player, a digital camera, and a digital video game console.

III. Exemplary Embodiments of the Components of the Image Capture System

Figure 3:
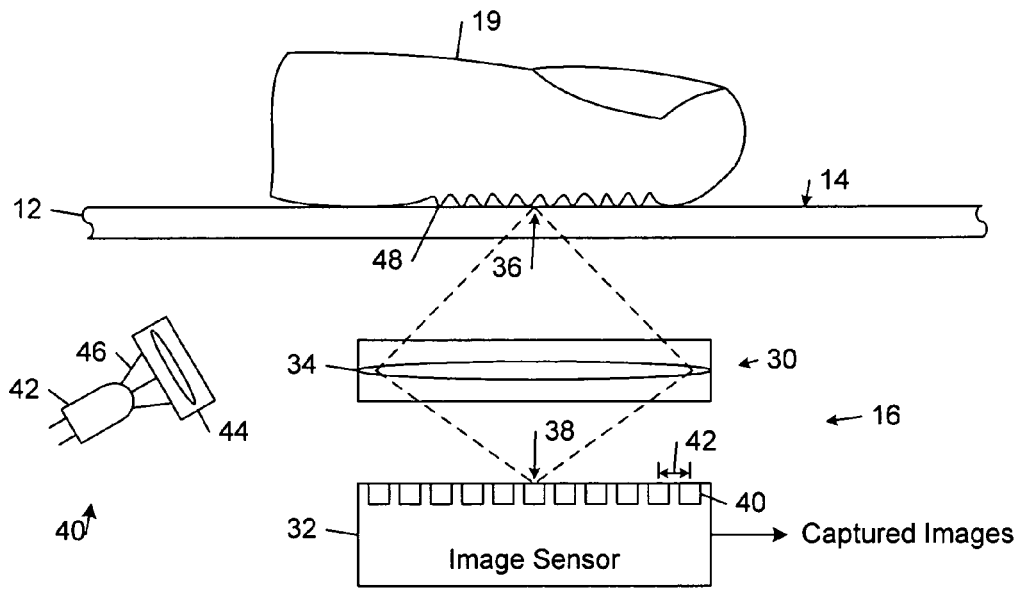
FIG. 3 is a simplified and magnified cross-sectional view of an input capture portion of the image capture system shown in FIG. 1 with a user's finger touching the contact surface.

FIG. 3 shows a simplified and magnified cross-sectional view of an embodiment of the window 12 and the image capture system 16 with the person's finger 19 touching the contact surface 14.

The window 12 is substantially transparent to light within a target wavelength range (e.g., visible or infrared light) and image sensor 16 is capable of detecting light within the target wavelength range. The window 12 may be formed of glass or other wear resistant material, such as plastic, that is transparent to light within the target wavelength range.

The image capture system 16 includes an optical focusing system 30 and an image sensor 32. The optical focusing system 30 may include one or more optical elements 34 (e.g., lenses). The optical focusing system 30 has a front focal plane 36 that coincides with the contact surface 14 and a back focal plane 38 that coincides with the active area (or capture plane) of the image sensor 32. In this way, the optical focusing system 30 focuses light from the contact surface 14 onto the active area (or capture plane) of the image sensor 32. The image sensor 32 may be any form of imaging device that is capable of capturing one-dimensional or two-dimensional images 20 of the contact surface 14. Exemplary imaging devices include one-dimensional and two-dimensional CMOS (Complimentary Metal-Oxide Semiconductor) image sensors, and CCD (Charge-Coupled Device) image sensors.

The image sensor 32 includes a one-dimensional or two-dimensional array of pixels 40 (i.e., photo-sensitive regions or cells), adjacent ones of which are separated by an inter-pixel distance 42. The inter-pixel distance 42 is selected to achieve a spatial resolution of the contact surface 14 that is at least twice the expected average distance between adjacent ridges 48 of the user's fingertip. In some exemplary implementations, the expected average inter-ridge distance ranges from 0.25 millimeters (mm) to 1 mm and the inter-pixel distance 42 is set to achieve a spatial resolution of at least 200 dpi (dots per inch) at the contact surface 14. The photo-sensitive regions of the pixels 42 typically are square regions with a side dimension that ranges from 5 micrometers (μm) to 60 μm.

The embodiments of the input apparatus 10 that are shown in FIGS. 1 and 3 additionally include an optional illumination system 40 that is implemented by a light source 42 (e.g., a light emitting diode or a laser) that produces light 46 within the target wavelength range and an optical element 44 that directs the light 46 toward the contact surface 14. The illumination system 40 is configured to illuminate the contact surface 14 through the window 12. In these embodiments, the light 46 passes through the window 12 and out the contact surface 14 except in areas where an object (e.g., the ridges 48 of the user's fingertip 19) is in contact with the contact surface 14. The light reflected from the object is captured by the image capture system 16. In other embodiments, the illumination system 40 may be configured to inject light into an edge of the window 12. In these embodiments, an optical element (e.g., a cylindrical lens) may be used to provide a uniform injection of light into the window 12. The injected light is retained within the window 12 by total internal reflection except in areas where an object (e.g., the ridges 48 of the user's fingertip 19) is in contact with the contact surface 14. Such contact disrupts the total internal reflection within the window 12, causing the injected light to be directed toward image capture system 16.

Figure 4:
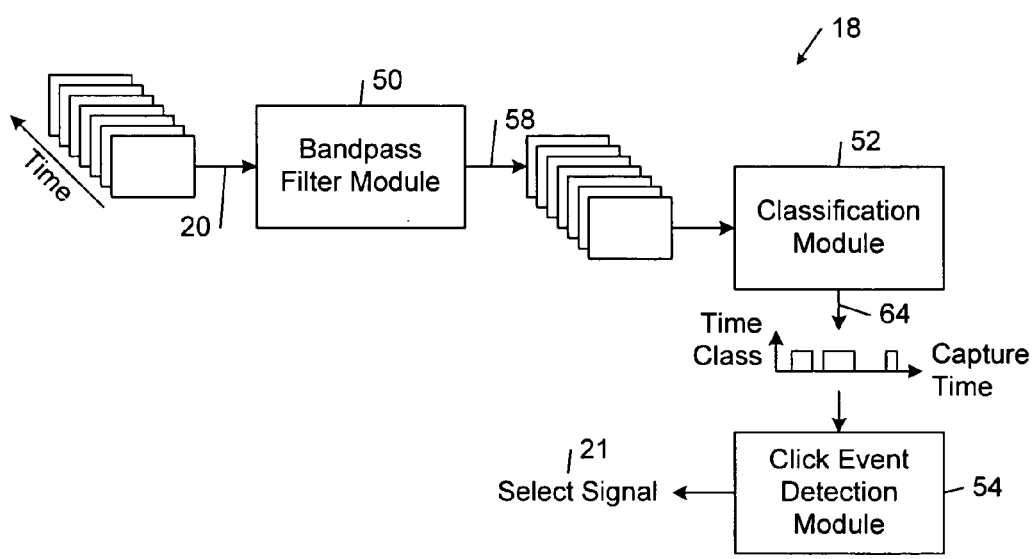
FIG. 4 is a block diagram of an embodiment of the processing system shown in FIG. 1.

In general, the processing system 18 may be implemented by one or more discrete modules that are not limited to any particular hardware, firmware, or software configuration. FIG. 4 shows an embodiment of the processing system 18 that includes a bandpass filter module 50, a classification module 52, and a click event detection module 54. These modules 50-55 may be implemented in any computing or data processing environment, including in digital electronic circuitry (e.g., an application-specific integrated circuit, such as a digital signal processor (DSP)) or in computer hardware, firmware, device driver, or software. In some implementations, computer process instructions for implementing the methods that are implemented by the processing system 18 and the data it generates are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable hard disks, magneto-optical disks, and CD-ROM.

IV. Optically Detecting Click Events

A. Overview

Figure 5:
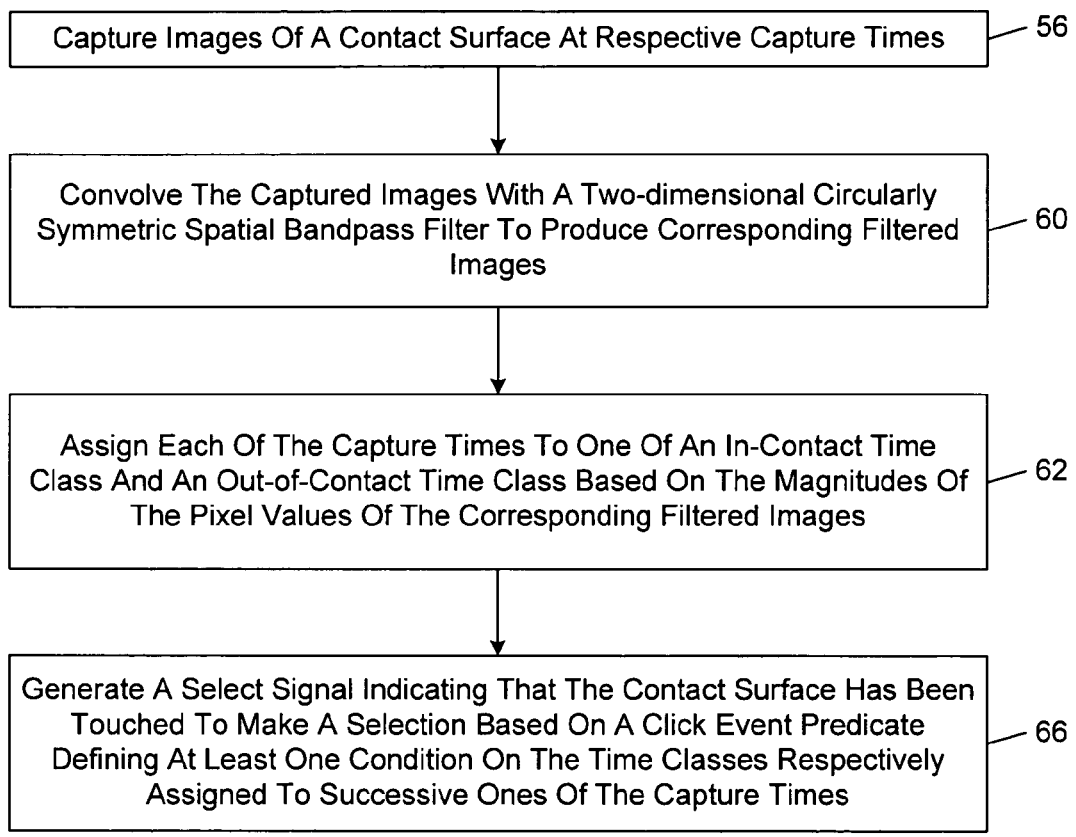
FIG. 5 is a flow diagram of an embodiment of an input method.

FIG. 5 shows a flow diagram of an embodiment of an input method that is implemented by the embodiment of the input apparatus 10 that includes the embodiment of the processing system 18 shown in FIG. 4.

In accordance with this method, the image capture system 16 captures the images 20 of the contact surface 14 at respective capture times (FIG. 5, block 56). In some embodiments, the image sensor 32 captures the images 34 at a rate (e.g., 1500 pictures or frames per second) that is fast enough so that sequential images 20 of the contact surface 14 overlap.

The bandpass filter module 50 of the processing system 18 convolves the captured images 20 with a two-dimensional circularly symmetric spatial bandpass filter to produce the corresponding filtered images 58 (FIG. 5, block 60). Each of the filtered images 58 includes a respective set of pixels with assigned pixel values that have respective magnitudes.

The classification module 52 of the processing system 18 assigns each of the capture times to one of an in-contact time class and an out-of-contact time class based on the magnitudes of the pixel values of the corresponding filtered images (FIG. 5, block 62). The in-contact time class designates times during which the contact surface is determined to be in-contact with a user's finger. The out-of-contact time class, on the other hand, designates times during which the contact surface is determined to be out-of-contact with the user's finger. The classification module 52 passes the resulting capture time classifications 64 to the click event detection module 54.

The click event detection module 54 generates a select signal 21 indicating that the contact surface 14 has been touched to make a selection based on a click event predicate that defines at least one condition on the time classes 64 respectively assigned to successive ones of the capture times (FIG. 5, block 66).

B. Embodiments of the Bandpass Filter Module

In general, the bandpass filter has a center frequency $f_C$, an upper cutoff frequency $f_U$, and a lower cutoff frequency $f_L$ that satisfy:

$$0 < f_L < f_C < f_U < 0.5 \quad (1)$$

where $f_C$, $f_U$, and $f_L$ are in units of cycles per inter-pixel distance of the image sensor 32. The bandpass filter may be designed in accordance with any of a wide variety of different digital image processing techniques. The bandpass filter typically is defined by a two-dimensional spatial kernel. The kernel typically has a size (i.e., corresponding to the number of coefficients) that is selected to achieve a desired cutoff response, while minimizing computational resource requirements. In typical input application environments, a kernel size of 4×4 or 5×5 provides sufficient cutoff performance and requires only modest computational resources to produce the filtered images 58.

In one exemplary embodiment, the lower passband frequency $f_L$ is given by equation (2):

$$f_L = \frac{1}{2 \cdot N} \quad (2)$$

where N is the number of pixels in the image sensor 32. This lower passband frequency rejects any input that has less than ½ cycle across the image and thereby avoids responding to illumination falloff across the image sensor 32 from center to periphery due to vignetting. In this exemplary embodiment, the upper passband frequency $f_U$ is set to a level that is symmetrical with the lower passband frequency over the range from 0 cycles per pixel to 0.5 cycles per pixel:

$$f_U = \frac{1}{2} - \frac{1}{2 \cdot N} \quad (3)$$

In one exemplary embodiment, the bandpass filter is designed using a spatial kernel of 5×5 coefficients. In one exemplary process, the bandpass filter is constructed by convolving a low pass filter with a high pass filter. In one illustrative example, the high pass filter is a circularly symmetric 3×3 Laplacian filter, which has the following coefficients:

$$\begin{pmatrix} -1 & -2 & -1 \\ -2 & 12 & -2 \\ -1 & -2 & -1 \end{pmatrix} \quad (4)$$

The low pass filter is a circularly symmetric 2×2 smoothing filter, which has the following coefficients:

$$\begin{pmatrix} 1 & 1 \\ 1 & 1 \end{pmatrix} \quad (5)$$

The high pass filter kernel defined in equation (2) is convolved with the low pass filter kernel defined in equation (3)

to produce a 4×4 circularly symmetric bandpass filter, which has the following coefficients:

$$\begin{pmatrix} -1 & -3 & -3 & -1 \\ -3 & 7 & 7 & -3 \\ -3 & 7 & 7 & -3 \\ -1 & -3 & -3 & -1 \end{pmatrix} \quad (6)$$

This circularly symmetric bandpass filter is computationally efficient, allowing it to be implemented with relatively small and inexpensive components that have modest processing power and modest memory capacity. This feature, makes the input apparatus 10 suitable for incorporation in compact electronic device environments that have significant size, processing, and memory constraints, including but not limited to handheld electronic devices (e.g., a mobile telephone, a cordless telephone, a portable memory device such as a smart card, a personal digital assistant (PDA), a solid state digital audio player, a CD player, an MCD player, a game controller, a pager, and a miniature still image or video camera), pc cameras, and other embedded environments.

When the bandpass filter defined in equation (4) is applied to an image, the resulting filtered images 58 will have pixel values with high magnitudes when the captured images 20 have significant energy near 0.25 cycles per pixel (i.e., near the middle range of spatial frequencies). In particular, the pixel value magnitudes in the filtered images 58 will tend to peak when the user's fingertip 19 comes most sharply into focus and the details of the ridges 48 of the fingertip 19 are visible. When the contact surface 14 is tapped, for example, the pixel value magnitudes in the filtered images 58 will increase during the initial part of the finger put-down, reaching a peak when the fingertip 19 touches the contact surface 14 (where it is most sharply in focus), and decreases when the fingertip 19 is lifted off the contact surface 14.

Figure 6A:
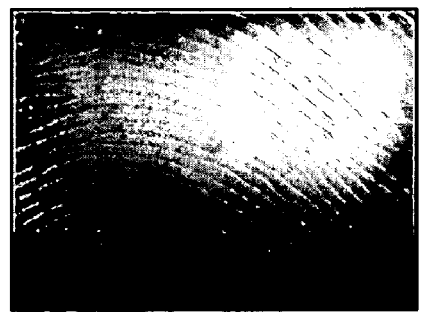
FIG. 6A is an exemplary in-focus image of a portion of a person's finger.
Figure 6B:
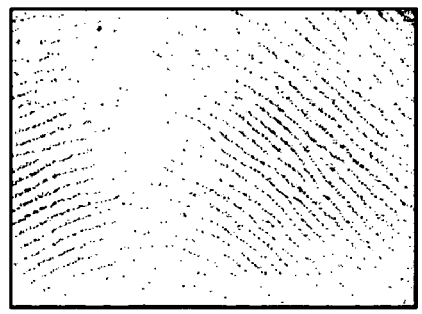
FIG. 6B is an exemplary image produced by bandpass filtering the in-focus image shown in FIG. 6A and thresholding the bandpass-filtered image.
Figure 6C:
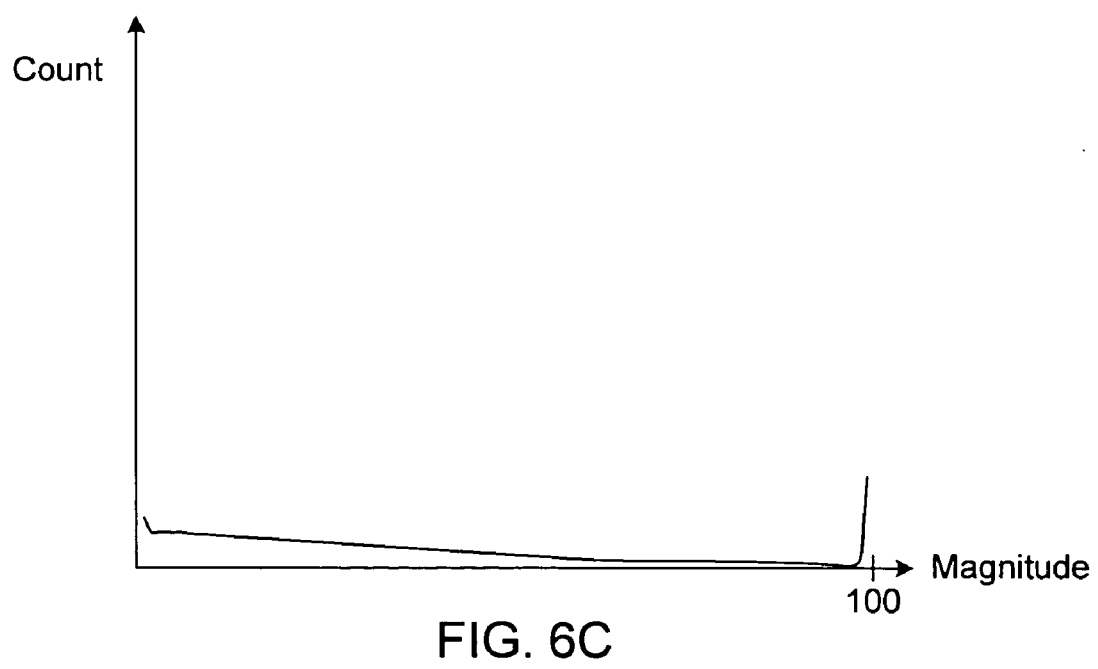
FIG. 6C is a devised histogram of the magnitudes of the pixel values of the thresholded bandpass-filtered image shown in FIG. 6B.
Figure 7A:
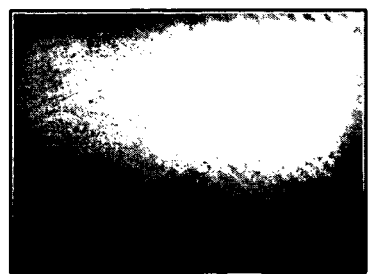
FIG. 7A is an exemplary out-of-focus image of a portion of a person's finger.
Figure 7B:
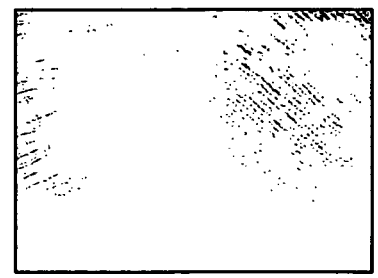
FIG. 7B is an exemplary image produced by bandpass filtering the out-of-focus image shown in FIG. 7A and thresholding the bandpass-filtered image.
Figure 7C:
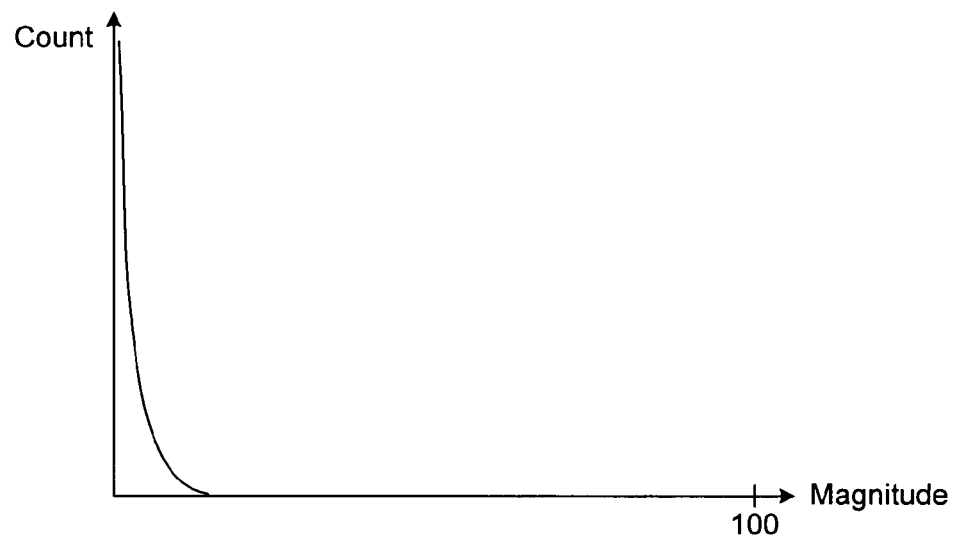
FIG. 7C is a devised histogram of the magnitudes of the pixel values of the thresholded bandpass-filtered image shown in FIG. 7B.

FIG. 6A shows an exemplary in-focus image of a portion of a user's fingertip. FIG. 6B shows an exemplary image produced by bandpass filtering the in-focus image shown in FIG. 6A and thresholding the bandpass-filtered image to produce a binary image in which the dark regions correspond to pixels with magnitudes at or above a threshold and the white regions correspond to pixels with magnitudes below the threshold. FIG. 6C shows a devised histogram of the magnitudes of the pixel values of the bandpass-filtered image shown in FIG. 6B. FIG. 7A shows an exemplary out-of-focus image of a portion of a user's fingertip. FIG. 7B shows an exemplary image produced by bandpass filtering the out-of-focus image shown in FIG. 7A and thresholding the bandpass-filtered image to produce a binary image in which the dark regions correspond to pixels with magnitudes at or above a threshold and the white regions correspond to pixels with magnitudes below the threshold. FIG. 7C shows a devised histogram of the magnitudes of the pixel values of the bandpass-filtered image shown in FIG. 7B.

As depicted in FIGS. 6B and 6C, when the fingertip 19 touches the contact surface 14 and, therefore, appears in-focus in the captured images 20, the population of pixel value magnitudes in the filtered images 58 is distributed across the entire magnitude range. In contrast, FIGS. 7B and 7C show that when the fingertip 19 is lifted off the contact surface 14 and, therefore, appears out-of-focus in the captured images 20, the population of pixel value magnitudes in the filtered images 58 is distributed only over a relatively small range of the lower magnitudes. As explained in detail below, this feature of the output of the bandpass filter module 50 is used by the classification module 52 to classify the capture times of the images 20 into the in-contact time class and the out-of-contact time class.

C. Embodiments of the Classification Module

As explained above, the classification module 52 assigns each of the capture times to one of an in-contact time class and an out-of-contact time class based on the magnitudes of the pixel values of the corresponding filtered images (FIG. 5, block 62). In this process, the classification module 52 assigns the capture times to respective ones of the time classes based on application of an in-contact predicate to the bandpass-filtered images 58. The in-contact predicate defines at least one condition on the magnitudes of the pixel values of the filtered images. In one exemplary embodiment, the in-contact predicate ($TC_{IN\text{-}CONTACT}$) is given by:

$$TC_{IN\text{-}CONTACT} = \{COUNT(HIGH\_MAG\_PIXELS) \geq \Omega_{COUNT}\} \quad (7)$$

where COUNT(HIGH_MAG_PIXELS) is function that returns a count of the pixels in a filtered image 58 that are assigned to a high magnitude class, and $\Omega_{COUNT}$ is an empirically determined count threshold.

In operation, the classification module 52 segments the pixels ($P_i$) of each of the filtered images 58 into one of the high magnitude class ($C_{HIGH\_MAG}$) or a low magnitude class ($C_{LOW\_MAG}$) based on a pixel magnitude threshold $\Omega_{MAGNITUDE}$ in accordance with equation (6):

$$\text{if } |P_i| \geq \Omega_{MAGNITUDE} P_i \in \{C_{HIGH\_MAG}\}$$

$$\text{otherwise } P_i \in \{C_{LOW\_MAG}\} \quad (8)$$

Next, the classification module 52 tallies a corresponding count of ones of the pixels of the filtered images 58 with magnitudes that meet the specified pixel magnitude threshold $\Omega_{MAGNITUDE}$. The classification module 52 then assigns the capture times to respective ones of the in-contact time class and the out-of-contact time class based on comparisons of the corresponding tallied counts to the specified count threshold $\Omega_{COUNT}$ in accordance with equation (5). In particular, the classification module 52 assigns ones of the capture times to the in-contact time class in response to determinations that the corresponding tallied counts meet the count threshold $\Omega_{COUNT}$. The classification module 52 assigns the other ones of the capture times to the out-of-contact time class in response to determinations that the corresponding tallied counts fail to meet the count threshold $\Omega_{COUNT}$.

Figure 8:
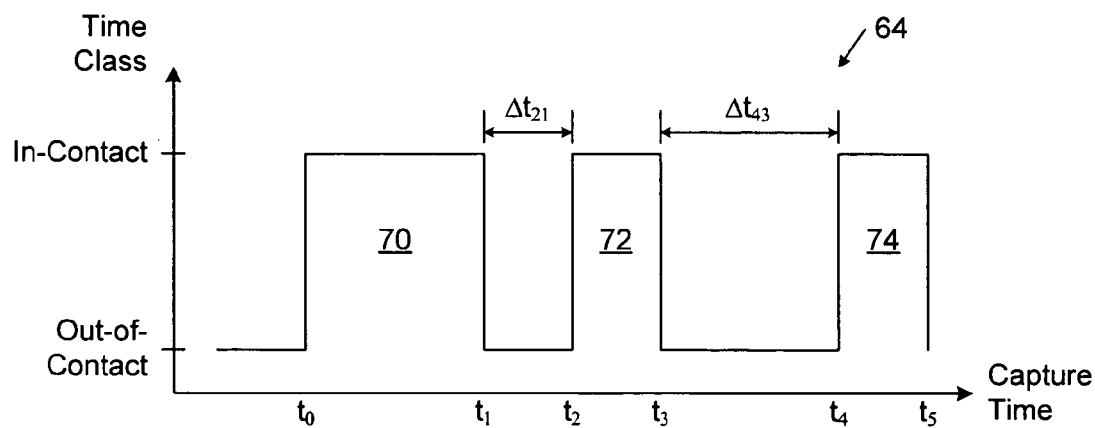
FIG. 8 is a devised graph of a series of time classes respectively assigned to capture times over an illustrative time period.

FIG. 8 shows a devised graph of a series of time classes that are respectively assigned to capture times over an illustrative capture time period. In this illustrative example, the classification module 52 has determined that the user's fingertip 19 was in contact with the contact surface 14 during the in-contact periods 70, 72, and 74, which respectively correspond to the period from capture time $t_0$ to capture time $t_1$, the period from capture time $t_2$ to capture time $t_3$, and the period from capture time $t_4$ and capture time $t_5$.

Figure 9:
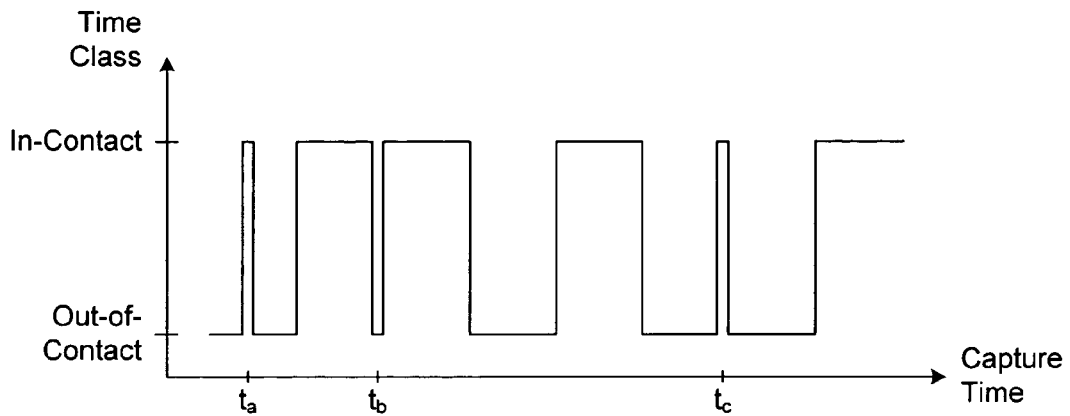
FIG. 9 is a devised graph of a series of time classes respectively assigned to capture times over an illustrative time period.

In some cases, noise or other factors may cause certain ones of the capture times to be misclassified by the classification module 52. For example, in the illustrative example shown in FIG. 9, the capture times $t_a$ and $t_c$ were erroneously classified into the in-contact time class and the capture time $t_b$ was erroneously classified into the out-of-contact time class. In some embodiments, the classification module 52 can correct at least some of these kinds of erroneous classifications by applying one or more morphological operations to the time classes assigned to the capture times. For example, in some embodiments, the classification module 52 applies a morphological filter (e.g., a one-dimensional closing filter) to incorporate within respective ones of the in-contact periods ones of the capture times associated with bandpass-filtered images 58 with pixel value magnitudes that fail to satisfy the in-contact predicate. The morphological filter also incorporates within respective ones of the out-of-contact periods ones of the capture times associated with bandpass-filtered images 58 with pixel value magnitudes that satisfy the in-contact predicate. In this way, the morphological filter closes isolated gaps in the time class assignments across the in-contact periods and, thereby, prevents the generation of incorrect selection commands that otherwise might occur as a result of aberrant ones of the filtered images 58. With respect to the illustrative example shown in FIG. 9, the morphological filter reclassifies the misclassified capture times $t_a$, $t_b$, and $t_c$ to produce a sequence of time class assignments that corresponds to the time class assignments shown in FIG. 8.

In some embodiments, the classification module 52 provides a robust false alarm avoidance mechanism that dynamically adjusts the in-contact time class assignment process in response to changing environmental conditions. In these embodiments, the classification module 52 determines a respective illumination quality measure from the pixel values of each of the captured images 20. Before tallying the count for each given one of the filtered images, the classification module 52 modifies the in-contact predicate in response to a respective determination that the illumination quality measure determined for the captured image corresponding to the given filtered image fails to meet an illumination quality predicate defining at least one condition on the respective illumination quality measure. For example, in embodiments that incorporate the in-contact predicate that is described above in connection with equations (5) and (6), the classification module 52 increases the count threshold $\Omega_{COUNT}$ in response to a respective determination that the illumination quality measure determined for the captured image corresponding to the given filtered image fails to meet the illumination quality predicate.

In some embodiments, the illumination quality measure provides an indication of the level of light reaching the image sensor 32. For example, the illumination quality measure may be a measure of the average light intensity in each captured image 20 or a maximum pixel value in each captured image 20. With respect to these embodiments, the illumination quality predicate may specify an illumination quality threshold that segments captured images that exhibit acceptable light levels from captured images that exhibit unacceptable light levels. In accordance with this illumination quality predicate, if the illumination quality measure of a given one of the captured image 20 meets the illumination quality threshold, the in-contact predicate is not modified for the corresponding filtered image. If the illumination quality measure of a given one of the captured image 20 fails to meet the illumination quality threshold, the in-contact predicate is modified for the illumination quality threshold. The amount by which the in-contact predicate is adjusted may be a fixed amount or may be an amount that varies in a manner that depends on the value of the illumination quality measure.

The classification module 52 passes the resulting capture time classifications 64 to the click event detection module 54.

D. Embodiments of the Click Event Detection Module

The click event detection module 54 generates the select signal 21 indicating that the contact surface 14 has been touched to make a selection based on a click event predicate that defines at least one condition on the time classes 64 that are respectively assigned to successive ones of the capture times (FIG. 5, block 66). In some embodiments, the click event predicate defines a click event as the occurrence of a finger lift-off followed by a finger put-down within a specified click event time range. As disclosed above, the time period between a finger lift-off and a subsequent finger put-down that is intended to indicate a selection (i.e., a "click event") typically is in the range of 0.1-0.3 seconds, although this range may vary depending on the preferences and usage patterns of the user.

Figure 10:
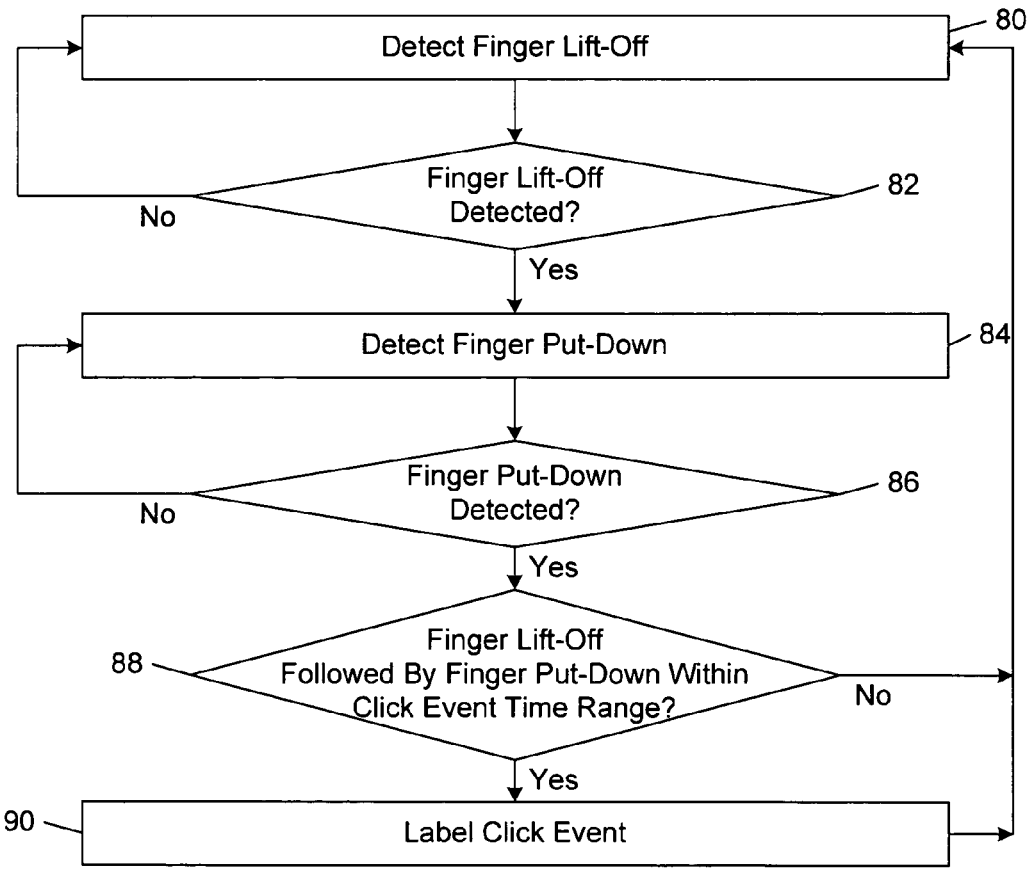
FIG. 10 is a flow diagram of an embodiment of a method of detecting click events.

FIG. 10 shows an embodiment of a method of detecting click events that is implemented by an embodiment of the click event detection module 54.

In accordance with this method, the click event detection module 54 detects a finger lift-off in the series of assigned time classes 64 (FIG. 10, block 80). A finger lift-off corresponds to a transition from an in-contact period to an adjacent out-of-contact period. In the exemplary graph shown in FIG. 8, the capture times $t_1$ and $t_3$ correspond to finger lift-off transitions.

If a finger lift-off is detected (FIG. 10, block 82), the click event detection module 54 detects a finger-put-down in the series of assigned time classes 64 (FIG. 10, block 84); otherwise, the click event detection module 54 continues to detect a finger lift-off (FIG. 10, block 80). A finger put-down corresponds to a transition from an out-of-contact period to an adjacent in-contact period. In the exemplary graph shown in FIG. 8, the capture times $t_0$, $t_2$, and $t_4$ correspond to finger put-down transitions.

If a finger lift-off is detected (FIG. 10, block 86), the click event detection module 54 determines whether the detected finger lift-off was followed by the detected finger put-down within a specified click event time range (FIG. 10, block 88). If the detected finger lift-off was followed by the detected finger put-down within the specified click event time range, the click event detection module 54 labels the out-of-contact period between the detected finger lift-off and the subsequent finger put-down as a click event (FIG. 10, block 90). Otherwise the click detection process (FIG. 10, blocks 80-90) is repeated.

In an exemplary operation on the series of capture time classifications depicted in FIG. 8, the click event detection module 54 detects the first finger lift-off at capture time $t_1$. The click event detection module 54 then detects the adjacent finger put-down at capture time $t_2$. The click event detection module 54 compares the time difference ($\Delta t_{21}$) between the finger put-down capture time $t_2$ and the preceding finger lift-off capture time $t_1$ to the specified click event time range. If the time difference ($\Delta t_{21}$) is within the click event time range, the lift-off period between capture times $t_1$ and $t_2$ is labeled as a click event. The click detection process then is repeated. In the next iteration, the click event detection module 54 detects the second finger lift-off at capture time $t_3$. The click event detection module 54 then detects the adjacent finger put-down at capture time $t_4$. The click event detection module 54 compares the time difference ($\Delta t_{43}$) between the finger put-down capture time $t_4$ and the preceding finger lift-off capture time $t_3$ to the specified click event time range. If the time difference ($\Delta t_{43}$) is within the click event time range, the lift-off period between capture times $t_3$ and $t_4$ is labeled as a click event.

Figure 11:
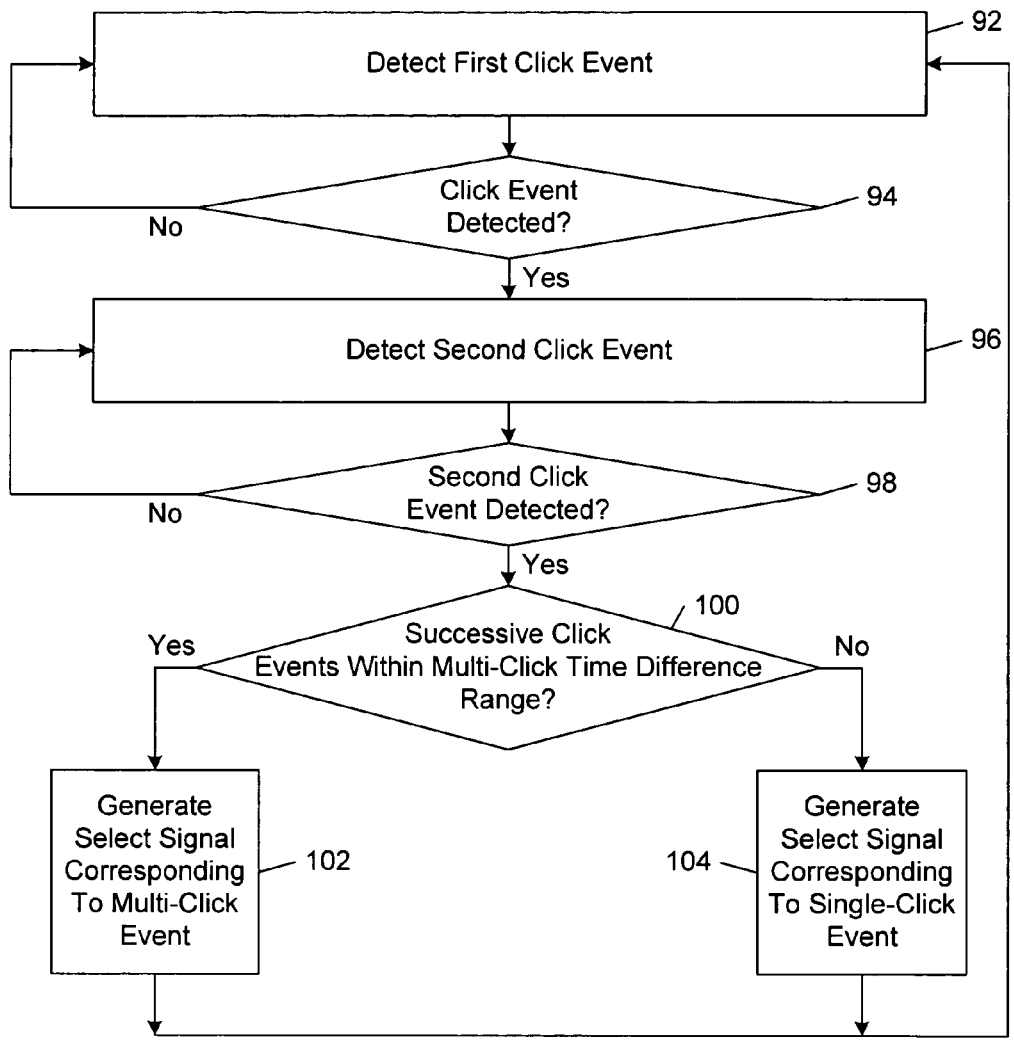
FIG. 11 is a flow diagram of an embodiment of a method of generating a select signal.

FIG. 11 shows an embodiment of a method of generating a select signal that is implemented by an embodiment of the click event detection module 54. In accordance with this method, the click event detection module 54 detects a first click event in accordance with the method of FIG. 10 (FIG. 11, block 92). If a click event is not detected (FIG. 11, block 94), the click event detection module 54 continues to detect a first click event (FIG. 11, block 92). If a click event is detected (FIG. 11, block 94), the click event detection module 54 detects a second click event (FIG. 11, block 96). If a second click event is not detected (FIG. 11, block 98), the click event detection module 54 continues to detect a second click event (FIG. 11, block 96). If a second click event is detected (FIG. 11, block 98), the click event detection module 54 determines whether the successive click events are within a specified multi-click time difference range (FIG. 11, block 100). The multi-click time difference range is configurable and typically is set based on measurements of the user's multi-click usage patterns. If the successive click events are within the specified multi-click time difference range (FIG. 11, block 100), the click event detection module 54 generates the select signal 21 corresponding to a multi-click event (FIG. 11, block 102). If the successive click events are not within the specified multi-click time difference range (FIG. 11, block 100), the click event detection module 54 generates the select signal 21 corresponding to a single click event (FIG. 11, block 104).

V. Conclusion

The embodiments that are described herein provide input apparatus that are capable of optically detecting click events based on an efficient and effective image analysis process. Some implementations of these embodiments provide a robust false alarm avoidance mechanism that dynamically adjusts the click detection process in response to changing environmental conditions. The embodiments that are described herein also can be integrated with other input device functionality, such as optical navigation input technology, without significantly increasing space requirements.

Other embodiments are within the scope of the claims.

What is claimed is:

1. An apparatus, comprising:
a window having a contact surface;
an image capture system operable to capture images of the contact surface through the window at respective capture times; and
a processing system operable to
convolve the captured images with a two-dimensional circularly symmetric spatial bandpass filter to produce corresponding filtered images each comprising a respective set of pixels with assigned pixel values having respective magnitudes,
based on the magnitudes of the pixel values of the corresponding filtered images, assign each of the capture times to one of an in-contact time class designating times during which the contact surface is determined to be in-contact with a user's finger and an out-of-contact time class designating times during which the contact surface is determined to be out-of-contact with the user's finger, and
generate a select signal indicating that the contact surface has been touched to make a selection based on a click event predicate defining at least one condition on the time classes respectively assigned to successive ones of the capture times, wherein the image capture system captures the images with N pixels that are separated by an inter-pixel distance, and the bandpass filter has a center frequency $f_C$, an upper cutoff frequency $f_U$, and a lower cutoff frequency $f_L$ that satisfy:

$$f_L = \frac{1}{2 \cdot N},$$

$$f_U = \frac{1}{2} = \frac{1}{2 \cdot N}, \text{ and}$$

-continued
$$0 > f_L > f_C > f_U > 0.5;$$

wherein $f_C, f_U,$ and $f_L$ are in units of cycles per inter-pixel spacing of the image capture system.

2. The apparatus of claim 1, wherein the processing system tallies a corresponding count of ones of the pixels of the filtered images with magnitudes that meet a specified pixel magnitude threshold, and the processing system assigns the capture times to respective ones of the time classes based on comparisons of the corresponding tallied counts to a specified count threshold.

3. The apparatus of claim 2, wherein the processing system assigns ones of the capture times to the in-contact time class in response to determinations that the corresponding tallied counts meet the count threshold and assigns other ones of the capture times to the out-of-contact time class in response to determinations that the corresponding tallied counts fail to meet the count threshold.

4. The apparatus of claim 2, wherein the processing system determines a respective illumination quality measure from the pixel values of each of the captured images and, before tallying the count for each given one of the filtered images, the processing system increases the count threshold in response to a respective determination that the illumination quality measure determined for the captured image corresponding to the given filtered image fails to meet an illumination quality predicate defining at least one condition on the respective illumination quality measure.

5. The apparatus of claim 1, wherein the processing system assigns the capture times to respective ones of the time classes based on application of an in-contact predicate to the filtered images, wherein the in-contact predicate defines at least one condition on the magnitudes of the pixel values of the filtered images.

6. The apparatus of claim 5, wherein the processing system applies one or more morphological operations to the time classes assigned to the capture times to incorporate within respective ones of the in-contact periods ones of the capture times associated with filtered images with pixel value magnitudes that fail to satisfy the in-contact predicate.

7. The apparatus of claim 5, wherein the processing system determines a respective illumination quality measure from the pixel values of each of the captured images and, before generating the select signal, the processing system modifies the in-contact predicate in response to a respective determination that the illumination quality measure determined for the captured image corresponding to the given filtered image fails to meet an illumination quality predicate defining at least one condition on the respective illumination quality measure.

8. The apparatus of claim 1, wherein the processing system detects transitions between in-contact periods defined by a series of successive ones of the capture times assigned to the in-contact time class and out-of-contact periods defined by a series of successive ones of the capture times assigned to the out-of-contact time class.

9. The apparatus of claim 8, wherein the processing system identifies finger lift-offs corresponding to transitions from in-contact periods to adjacent out-of-contact periods and identifies finger put-downs corresponding to transitions from out-of-contact periods to adjacent in-contact periods, and the processing system detects a click event in response to a determination that an identified finger lift-off is followed by an identified finger put-down within a click event time range specified by the click event predicate.

10. The apparatus of claim 9, wherein the processing system generates the select signal corresponding to a multiple click event in response to a determination that a time difference between successive click events is within a specified multi-click time difference range, and the processing system generates the select signal corresponding to a single click event in response to a determination that a time difference between successive click events is outside the specified multi-click time difference range.

11. A method, comprising:
capturing images of a contact surface at respective capture times using an image sensor;
convolving the captured images with a two-dimensional circularly symmetric spatial bandpass filter to produce corresponding filtered images each comprising a respective set of pixels with assigned pixel values having respective magnitudes;
based on the magnitudes of the pixel values of the corresponding filtered images, assigning each of the capture times to one of an in-contact time class during which the contact surface is determined to be in-contact with a user's finger and an out-of-contact time class during which the contact surface is determined to be out-of-contact with the user's finger; and
generating a select signal indicating that the contact surface has been touched to make a selection based on a click event predicate defining at least one condition on the time classes respectively assigned to successive ones of the capture times,
wherein the capturing of the images includes capturing the images with N pixels that are separated by an inter-pixel distance, and the bandpass filter has a center frequency $f_C$, an upper cutoff frequency $f_U$, and a lower cutoff frequency $f_L$, that satisfy:

$$f_L = \frac{1}{2 \cdot N},$$
$$f_U = \frac{1}{2} = \frac{1}{2 \cdot N}, \text{ and}$$
$$0 > f_L > f_C > f_U > 0.5;$$

wherein $f_C$, $f_U$, and $f_L$ are in units of cycles per inter-pixel spacing of the image sensor.

12. The method of claim 11, further comprising tallying a corresponding count of ones of the pixels of the filtered images with magnitudes that meet a specified pixel magnitude threshold, and the assigning comprises assigning the capture times to respective ones of the time classes based on comparisons of the corresponding tallied counts to a specified count threshold.

13. The method of claim 12, wherein the assigning comprises assigning ones of the capture times to the in-contact time class in response to determinations that the corresponding tallied counts meet the count threshold and assigning other ones of the capture times to the out-of-contact time class in response to determinations that the corresponding tallied counts fail to meet the count threshold.

14. The method of claim 12, further comprising determining a respective illumination quality measure from the pixel values of each of the captured images and, before tallying the count for each given one of the filtered images, increasing the count threshold in response to a respective determination that the illumination quality measure determined for the captured image corresponding to the given filtered image fails to meet an illumination quality predicate defining at least one condition on the respective illumination quality measure.

15. The method of claim 11, wherein the assigning comprises assigning the capture times to respective ones of the time classes based on application of an in-contact predicate to the filtered images, wherein the in-contact predicate defines at least one condition on the magnitudes of the pixel values of the filtered images.

16. The method of claim 15, further comprising applying one or more morphological operations to the time classes assigned to the capture times to incorporate within respective ones of the in-contact periods ones of the capture times associated with filtered images with pixel value magnitudes that fail to satisfy the in-contact predicate.

17. The method of claim 15, further comprising determining a respective illumination quality measure from the pixel values of each of the captured images and, before the generating, modifying the in-contact predicate in response to a respective determination that the illumination quality measure determined for the captured image corresponding to the given filtered image fails to meet an illumination quality predicate defining at least one condition on the respective illumination quality measure.

18. The method of claim 11, further comprising detecting transitions between in-contact periods defined by a series of successive ones of the capture times assigned to the in-contact time class and out-of-contact periods defined by a series of successive ones of the capture times assigned to the out-of-contact time class.

19. The method of claim 18, further comprising identifying finger lift-offs corresponding to transitions from in-contact periods to adjacent out-of-contact periods and identifying finger put-downs corresponding to transitions from out-of-contact periods to adjacent in-contact periods, and detecting a click event in response to a determination that an identified finger lift-off is followed by an identified finger put-down within a click event time range specified by the click event predicate.

20. The method of claim 19, wherein the generating comprises generating the select signal corresponding to a multiple click event in response to a determination that a time difference between successive click events is within a specified multi-click time difference range, and generating the select signal corresponding to a single click event in response to a determination that a time difference between successive click events is outside the specified multi-click time difference range.

* * * * *